United States Patent [19]
Iida et al.

[11] Patent Number: 5,888,929
[45] Date of Patent: Mar. 30, 1999

[54] SHEET SET FOR TEMPERATURE CONTROL AND METHOD OF USING THE SAME

[75] Inventors: Takeshi Iida; Tetsuo Tsuchida, both of Amagasaki, Japan

[73] Assignee: Oji Paper Co., Ltd., Tokyo, Japan

[21] Appl. No.: 982,031

[22] Filed: Dec. 1, 1997

[30] Foreign Application Priority Data

| Dec. 18, 1996 | [JP] | Japan | 8-338571 |
| Jan. 7, 1997 | [JP] | Japan | 9-000742 |
| May 30, 1997 | [JP] | Japan | 9-141845 |

[51] Int. Cl.$^6$ ..................................................... B41M 5/40
[52] U.S. Cl. ........................... 503/201; 427/152; 503/205
[58] Field of Search ..................................... 503/201, 205; 427/150–152

[56] References Cited

FOREIGN PATENT DOCUMENTS 58-0025987  2/1983  Japan ....................................... 503/205

*Primary Examiner*—Bruce H. Hess
*Attorney, Agent, or Firm*—Kubovcik & Kubovcik

[57] ABSTRACT

The present invention provides sheet sets for temperature control comprising a heat sensitive recording sheet having a heat sensitive recording layer incorporating a colorless or light-colored basic dye and a color acceptor, provided on a surface of a substrate, and an adhesive sheet having a first adhesive layer incorporating a decolorizing agent, provided on a surface of another substrate, and wherein, when using the sheet sets, the first adhesive layer of the adhesive sheet is laminated on the heat sensitive recording layer of the heat sensitive recording sheet.

12 Claims, No Drawings

SHEET SET FOR TEMPERATURE CONTROL AND METHOD OF USING THE SAME

The present invention relates to sheet sets for temperature control that can simply check whether articles or storage spaces requiring temperature controls have been kept below a predetermined temperature.

There has been a variety of articles whose display, preservation, transportation and the like are subject to strict temperature controls. Particularly, in recent years, large quantities of frozen foods and cold-storage foods have appeared on the market because of their convenience and simplicity, but handling of these foods requires strict temperature controls. Unless, after manufacturing frozen foods or cold-storage foods, they are controlled below each specific temperature in the course of transportation and preservation until they are transferred to homes, decay occurs due to the deterioration of the contents or the reproduction of various germs. If, however, deteriorated ones are preserved again at low temperature, they are indistinguishable in appearance from non-deteriorated ones. This may arise serious social problems.

In addition to frozen foods and cold-storage foods, examples of articles requiring such strict temperature controls include natural flowers, medicines, photographic chemicals, chemicals, and foods. Presently, however, it is difficult to check whether after manufacture of articles requiring strict temperature controls, which are represented by frozen foods and cold-storage foods, they are transferred to consumers in strict accordance with necessary temperature controls. Therefore, related industries demand concrete temperature control systems.

In the meantime, heat sensitive recording materials are well known which utilize a color forming reaction between a colorless or light-colored basic dye and an organic or inorganic color acceptor to obtain recorded images by thermally bringing the two chromogenic substances into contact with each other. Such heat sensitive recording materials are relatively inexpensive, while recording devices therefor are compact and relatively easy to maintain, so that these materials serve as recording media for facsimile systems, various computers, etc. and are also used in a wide variety of fields.

As a part of the expansion of heat sensitive recording material applications, there are, for example, heat sensitive recording labels for POS (Point of Sales) label system. They are also widely used for commodity management utilizing bar codes, in supermarkets, convenience stores and the like.

On the other hand, as a method of obtaining temperature control systems for frozen foods and the like, JP-A-61186/1973 proposes a method of detecting changes in shape or color tone (in combination with coloring materials) at the time of melting. JP-A-55236/1985 proposes a method of disposing, in this order, a sheet containing Component (A) that melts at a predetermined temperature, a diaphragm through which melted Component (A) can transmit, and a sheet containing Component (B) that causes discoloration by the contact with Component (A). These methods, however have problems in time required for color formation, formed color density, stability at low temperature preservation, temperature control systems and the like, thus failing to provide those for practical applications.

An object of the present invention is to provide temperature control sheet sets that can easily check whether articles or storage spaces requiring temperature controls have been kept below a predetermined temperature.

The present invention provides sheet sets for temperature control comprising a heat sensitive recording sheet having a heat sensitive recording layer incorporating a colorless or light-colored basic dye and a color acceptor, provided on a surface of a substrate, and an adhesive sheet having a first adhesive layer incorporating a decolorizing agent, provided on a surface of another substrate, and wherein, when using the sheet sets, the first adhesive layer of the adhesive sheet is laminated on the heat sensitive recording layer of the heat sensitive recording sheet.

According to the present invention, temperature control sheet sets comprise a heat sensitive recording sheet having a heat sensitive recording layer incorporating a colorless or light-colored basic dye and a color acceptor, provided on a surface of a substrate, and an adhesive sheet having a first adhesive layer incorporating a decolorizing agent, provided on a surface of another substrate. At the time of use, the first adhesive layer of the adhesive sheet is laminated on the heat sensitive recording layer of the heat sensitive recording sheet, resulting in outstanding temperature control sheet sets that can easily and precisely detect preservation temperatures. When laminating a heat sensitive recording sheet and an adhesive sheet, a heat sensitive recording layer is in a colored-state. In order to form recorded images on a heat sensitive recording layer, there is a method in which a heat sensitive recording layer is given thermal energy, such as thermal heads, heating plates or hot air.

Sheet sets for temperature control are directed to control preservation temperatures of articles or storage spaces by laminating the first adhesive layer of the adhesive sheet on the heat sensitive recording layer of the heat sensitive recording sheet. It is possible to control decolorizing temperature and time by selecting basic dyes, color acceptors and decolorizing agents to be used. For instance, after a heat sensitive recording sheet is subjected to a bar code recording by a label printer, an adhesive sheet is laminated thereto (Only an adhesive layer of an adhesive sheet may be laminated thereto). Bar code records are not decolorized as long as being left below a predetermined temperature, but is decolorized progressively when it exceeds the predetermined temperature.

In the present invention, as a substrate for use in heat sensitive recording sheets and adhesive sheets, there are papers, films, synthetic papers, laminate papers and the like. The surface of a substrate may be submitted to a corona discharge, an anchor coat layer may be provided, or a substrate may be colored.

Various known basic dyes are usable as a colorless or light-colored basic dyes contained in the heat sensitive recording layer of the heat sensitive recording sheet. Examples thereof are 3,3-bis (p-dimethylaminophenyl)-6-dimethylaminophthalide, 3-(4-diethylamino-2-methylphenyl) -3-(4-dimethylaminophenyl) -6-dimethylaminophthalide, 3-diethylamino-7-dibenzylamino-benzo[a] fluoran, 3-(N-ethyl-p-toluidino)-7-methylfluoran, 3-diethylamino-7-methylfluoran, 3-diethylamino-7-dibenzylaminofluoran, 3,6-bis (diethylamino) fluoran-γ-anilinolactam, 3-cyclohexylamino-6-chlorofluoran, 3-diethylamino-6-methyl-7-chlorofluoran, 3-diethylamino-7-chlorofluoran, 3-diethylamino-6,7-dimethylfluoran, 3-di-n-butylamino-6-methyl-7-bromofluoran, 3,3'-bis(1-n-butyl-2-methylindole-3-yl) phthalide, 3,3'-bis(1-n-octyl-2-methylindole-3-yl)phthalide, 3-(N-ethyl-N-isoamyl)amino-6-methyl-7-anilinofluoran, 3-diethylamino-7-(m-trifluoromethylanilino)fluoran, 3-(N-methyl-N-cyclohexyl)amino-6-methyl-7-anilinofluoran, 3-diethylamino-6-methyl-7-anilinofluoran, 3-di-n-butylamino-6-methyl-7-anilinofluoran, 3-di-n-pentylamino-6-methyl-7-anilinofluoran, 3-diethylamino-7-(o- chloroanilino) fluoran, 3-di-n-butylamino-7-(o-chloroanilino)fluoran, 3-diethylamino-7-(o-fluoroanilino) fluoran, 3-di-n-butylamino-7-(o-fluoroanilino)fluoran, 3-(N-ethyl-p-toluidino)-6-methyl-7-anilinofluoran, 3-(N-ethyl-N-2-tetrahydrofurfurylamino)-6 -methyl-7-anilinofluoran, 3-diethylamino-6-chloro-7-anilinofluoran, 3-(N-methyl-N-n-propylamino)-6-methyl-7-anilinofluoran, 3,3-bis[1-(4-methoxyphenyl)-1-(4-dimethylaminophenyl)ethylene-2-yl]-4,5,6,7-tetrachloro-phthalide, 3,3-bis[1-(4-methoxyphenyl)-1-(4-pyrrolidinophenyl)ethylene-2-yl]-4,5,6,7-tetrachloro-phthalide, 3,6-bis(dimethylamino) fluorene-9-spiro-3'-(6'-dimethylamino)phthalide, 3,3-bis(4-diethylamino-2-ethoxyphenyl)-4-azaphthalide and 3-(4-dimethylamino) anilino-5,7-dimethylfluoran.

The basic dyes are not limited to the above and can be used in at least two of them as required. The basic dye can be used in an amount of preferably 3 to 35 wt. % based on the heat sensitive recording layer although not specifically limited.

Various known compounds are usable as a color acceptor used conjointly with the basic dye. Examples of color acceptors are hydroquinone monobenzyl ether, 4,4'-isopropylidenediphenol, 1,1-bis(4-hydroxyphenyl) cyclohexane, 4,4'-dihydroxydiphenyl-2,2-butane, 4,4'-dihydroxy-diphenylmethane, 2,2-bis(4-hydroxyphenyl)-4-methylpentane, 2,2-bis(4-hydroxyphenyl)heptane, bis(4-hydroxyphenyl-thioethoxy)methane, 1,5-di(4-hydroxyphenylthio)-3-oxapentane, 1,4-bis [α-methyl-α-(4'-hydroxyphenyl) ethyl] benzene, 1,3-bis[α-methyl-α-(4'-hydroxyphenyl) ethyl] benzene, 4,4'-dihydroxydiphenylsulfide, bis(4-hydroxy-3-methylphenyl)-sulfide, 4,4'-dihydroxydiphenylsulfone, 2,4'-dihydroxydiphenylsulfone, 4-hydroxy-4'-methyldiphenylsulfone, 4-hydroxy-4'-isopropoxydiphenylsulfone, 4-hydroxy-4'-benzyloxydiphenylsulfone, 4-hydroxy-3',4'-tetramethylenediphenylsulfone, 3,4-dihydroxy-4'-methyldiphenylsulfone, benzyl 4-hydroxybenzoate, 2,4-dihydroxy-2'-methoxybenzanilide, 1,1-bis(4-hydroxyphenyl)-1-phenylethane, N-p-tolylsulfonyl-N'-phenylurea, 4,4'-bis(p-tolylsulfonylaminocarbonylamino)-diphenylmethane, zinc 4-[2-(p-methoxyphenoxy)ethoxy]-salicylate, zinc 4-[2-(p-tolylsulfonyl)propoxy]salicylate, zinc 5-[p-(2-p-methoxyphenoxyethoxy)cumyl]salicylate and zinc 4-n-octyloxycarbonylaminosalicylate.

The proportion of the basic dye and the color acceptor is suitably selected depending on the kind of the basic dye and the color acceptor, and it is desirable to use the color acceptor in an amount of 50 to 500 parts by weight, preferably 100 to 300 parts by weight based on 100 parts by weight of the basic dye.

It is possible to incorporate a sensitizer or preservability improving agent in order to give an enhanced record sensitivity or improve the preservability of recorded images. Examples of useful sensitizers are stearic acid amide, stearic acid methylolamide, stearic acid ethylenebisamide, dibenzyl oxalate, di-p-methylbenzyl oxalate, di-p-chlorobenzyl oxalate, dimethyl terephthalate, dibenzyl terephthalate, 1-hydroxynaphthoic acid phenyl ester, 1,2-di(3-methylphenoxy)-ethane, 1,2-diphenoxyethane, 1-phenoxy-2-naphthoxyethane, 1-phenoxy-2-(4-methylphenoxy) ethane, 1-(4-methylphenoxy)-2-naphthoxyethane, 1,3-naphthoxypropane, 1,4-naphthoxybutane, p-benzylbiphenyl, m-terphenyl, benzyl 2-naphthyl ether, 1,2- bis(3,4-dimethylphenyl)ethane, 1,4-bis(p-tolyloxy) benzene, diphenylsulfone, diphenyl carbonate and 2-(2'-hydroxy-5'-methylphenyl)benzotriazole.

Examples of useful preservability improving agents are hindered phenol compounds such as 2,2'-methylenebis(4-methyl-6-tert-butylphenol), 2,2'-ethylenebis(4-methyl-6-tert-butylphenol), 2,2'-ethylidenebis(4-methyl-6-tert-butylphenol), 2,2'-ethylidenebis(4-ethyl-6-tert-butylphenol), 2,2'-methylenebis(6-tert-butylphenol), 4,4'-thiobis(3-methyl-6-tert-butylphenol), 4,4'-thiobis(5-methyl-6-tert-butylphenol), 4,4'-thiobis(2-chloro-6-tert-butylphenol), 4,4'-thiobis(2-ethyl-6-tert-butylphenol), 4,4'-butylidenebis(6-tert-butyl-m-cresol), 1-[α-methyl-α-(4'-hydroxyphenyl)ethyl]-4-[α',α'-bis(4"-hydroxyphenyl)ethyl] benzene, 1,1,3-tris(2-methyl-4-hydroxy-5-cyclohexylphenyl)butane, 1,1,3-tris(2-methyl-4-hydroxy-5-tert-butylphenyl)butane, 2,2-bis(4-hydroxy-3,5-dichlorophenyl)-propane, 2,2-bis(4-hydroxy-3,5-dimethylphenyl)propane; N,N'-di-2-naphthyl-p-phenylenediamine, sodium or magnesium salt of 2,2'-methylenebis(4,6-di-tert-butylphenyl)phosphate.

The sensitizer and preservability improving agent are used in an amount of up to 400 parts by weight per 100 parts by weight of the basic dye.

The coating composition for the heat sensitive recording layer is prepared by admixing together or individually a dispersant, the basic dye, color acceptor and, as required, sensitizer or preservability improving agent with water serving as a dispersing medium to obtain a dispersion having volume average particle size of about 0.3 to about 3 μm, and adding an adhesive with stirring. The heat sensitive recording layer is formed by coating and drying the above composition on the substrate.

Any of water-soluble resin or water-dispersible resin is usable as the adhesive in the heat sensitive recording layer. Examples thereof are water-soluble resins such as completely (or incompletely) saponified polyvinyl alcohol, acetoacetylated polyvinyl alcohol, silicon-modified polyvinyl alcohol, butyral-modified polyvinyl alcohol, starch, oxidized starch, gum arabic, gellatin, casein, chitosan, methyl cellulose, hydroxyethyl cellulose, hydroxymethyl cellulose, styrene-acrylic acid copolymer salt, styrene-maleic anhydride copolymer salt, methyl vinyl ether-maleic anhydride copolymer salt and isopropylene-maleic anhydride copolymer salt; water-dispersible resins such as vinyl acetate type latex, acrylate copolymer type latex, methacrylate copolymer type latex, vinyl acetate-(meth)acrylate copolymer type latex, polyurethane type latex, polyvinyl chloride type latex, polyvinylidene chloride type latex and styrene-butadiene copolymer type latex.

The adhesive can be used in an amount of preferably 5 to 40 wt. % based on the heat sensitive recording layer.

Further, it is possible to add as required a crosslinking agent, pigment, surfactant, lubricant, wax, coloring dye, fluorescent dye, etc.

Examples of crosslinking agents for improving the water resistance are dialdehyde compounds such as glyoxal and dialdehyde starch, polyamine compounds such as polyethyleneimine, epoxy compounds, polyamide resins, melamine resins, diglycidyl compounds such as glycerin diglycidyl ether, dimethylolurea compounds, aziridine compounds, block isocyanate compounds, ammonium persulfate, boric acid, ferric chloride and magnesium chloride. Examples of useful pigments are calcium carbonate, magnesium carbonate, magnesium oxide, kaolin, talc, amorphous silica, zinc oxide, titanium oxide, aluminum hydroxide, barium sulfate and urea-formalin resin filler. Examples of useful surfactants are acetylene glycol, sodium dialkylsulfosuccinate and sodium alkylbenzenesulfonate. Examples of useful lubricants are zinc stearate and calcium stearate. Examples of useful waxes are polyethylene wax, carnauba wax, paraffin wax and ester wax.

The method of forming the heat sensitive recording layer is not limited specifically. Examples of suitable coating methods include air knife coating, VARI-BAR blade coating, pure blade coating, rod blade coating, short dwell coating, curtain coating and die coating. The amount of the coating composition for forming the heat sensitive recording layer is about 2 to about 10 g/m², preferably about 3 to about 7 g/m² calculated as dry weight.

It is further possible to form a protective layer on the heat sensitive recording layer containing an adhesive, lubricant, pigment or the like in order to control a time for decolorization. The protective layer should be selected so that the decolorizing agent contained in the first adhesive layer penetrates into the heat sensitive recording layer through the protective layer.

Examples of adhesives usable in the protective layer are polyvinyl alcohol of various saponification degree, acetoacetylated polyvinyl alcohol, carboxylated polyvinyl alcohol, silicon-modified polyvinyl alcohol, acrylic resin and polyurethane resin. The amount of the adhesive is about 10 to about 95 wt. %, preferably about 30 to about 90 wt. % based on the total solids of the protective layer. The amount of the coating composition for forming the protective layer is about 0.3 to about 5.0 g/m², preferably about 0.5 to about 3.0 g/m² calculated as dry weight.

By providing a second adhesive layer on the other surface (the rear surface) of a heat sensitive recording sheet, the sheet sets for temperature control are usable by laminating them to articles. For second adhesive layers, similar adhesives to be used in the first adhesive layer described later are used. A second adhesive layer to be provided on the rear surface of a heat sensitive recording layer is applied to the rear surface of a heat sensitive recording sheet or the surface of a released paper by a roll coater, dye coater, gravure coater, screen printer or the like. The amount of the second adhesive layer is approximately in the range of 10 to 40g/m², preferably 15 to 25g/m², based on dry weight.

Various other known techniques in the field of heat sensitive recording materials can be applied. For example, an undercoat layer may be interposed between a substrate of a heat sensitive recording sheet and a heat sensitive recording layer. A supercalender treatment may be performed after forming the respective layers.

Various known rubber adhesives or acrylic resin adhesives containing butyl (meth)acrylate, 2-ethylhexyl (meth) acrylate, etc. are incorporated as a main component into the first adhesive layer of the invention. Examples of rubber adhesives are natural rubber, isoprene rubber, styrene-butadiene block copolymer, styrene-isoprene-styrene block copolymer, butyl rubber, styrene-ethylene-butylene-styrene block copolymer, polyisobutylene, polyvinyl isobutyl ether, chloroprene rubber and nitrile rubber.

To the first adhesive layer can be added as required a tackifier such as rosin and like natural resin, modified rosin, derivatives of rosin and modified rosin, polyterpene resin, modified terpene, aliphatic hydrocarbon resin, cyclopentadiene resin, aromatic petroleum resin, phenol resin, alkylphenol-acetylene resin, coumarone-indene resin and vinyltoluene-α-methylstyrene copolymer, antioxidant, stabilizer, softener, filler (pigment), coloring agent, etc.

When a substrate for use in an adhesive sheet is opaque, it is desirable that an adhesive has removability. As a removable adhesive, styrene-isoprene-styrene-block copolymers are suitable because they have a large cohesive force in despite of their low molecular weights. More preferable are two-pack crosslinking type acrylic adhesives. Combining a two-pack crosslinking type acrylic adhesive with a suitable crosslinking agent such as an epoxy derivative, provides the following advantages. Specifically, when applied to the rear surface of a substrate, the crosslinking of an adhesive is not proceeded so that a certain amount of the adhesive penetrate the substrate, resulting in a suitable adhesion of the adhesive to the substrate. As the crosslinking of the adhesive is proceeded with time, there is an increase in cohesive force that leads to removability. In this type, it is easy to control adhesion and removability by selecting the type of acryls and crosslinking agents to be used.

Decolorizing agents for use in the first adhesive layers are held in the first adhesive layer below a predetermined temperature so that no influence is exerted on a heat sensitive recording layer, whereas, over a predetermined temperature, they penetrate the heat sensitive recording layer to decolorize recorded images. Examples of the decolorizing agents include alcohols, esters, ketones, ethers and amines. Among them preferable are non-volatile organic compounds having a melting point in the range of −50° C. to +40° C. Preferred non-volatile organic compounds are ester compounds, particularly ester compounds of the formula (1)

$$R_1COO-R_2 \qquad (1)$$

wherein $R_1$ is $C_7$~$C_{17}$ alkyl, and $R_2$ is $C_1$~$C_{12}$ alkyl or benzyl.

Examples of decolorizing agents are dimethyl maleate, diethyl maleate, diallyl maleate, di-n-butyl fumarate, diethyl tartrate, di-n-butyl sebacate, di-2-ethylhexyl sebacate, dimethyl phthalate, diethyl phthalate, di-n-butyl phthalate, di-n-heptyl phthalate, di-n-octyl phthalate, diisononyl phthalate, octyldecyl phthalate, butylbenzyl phthalate, tricresyl phosphate, dimetyl adipate, dietyl adipate, di-n-butyl adipate, di-n-hexyl adipate, di-n-octyl adipate, di-n-decyl adipate, butyl oleate, ethyl caprylate, n-butyl caprylate, isobutyl caprylate, n-decyl caprylate, n-decyl caprate, n-dodecyl caprate, n-octadecyl caprate, methyl myristate, ethyl myristate, isopropyl myristate, n-butyl myristate, isobutyl myristate, benzyl myristate, methyl laurate, ethyl laurate, n-hexyl laurate, n-hexyl laurate, benzyl laurate, ethyl palmitate, n-butyl palmitate, isobutyl palmitate, n-heptyl palmitate, 2-ethylhexyl laurate, n-decyl laurate, n-dodecyl laurate, n-octadecyl laurate, methyl stearate, ethyl stearate, n-butyl stearate, isoamyl stearate, 2-ethylhexyl stearate, benzyl stearate, n-octyl alcohol, n-decyl alcohol, n-dodecyl alcohol, methyl n-nonyl ketone, phenetole, n-octylamine and n-dodecylamine.

The decolorizing agents are not limited to the above and can be used in at least two of them as required. The decolorizing agent can be used in an amount of preferably 0.5 to 50% by weight, preferably 5 to 35% by weight based on the first adhesive layer although not specifically limited.

The first adhesive layer is formed by coating on the substrate a coating composition for a first adhesive layer containing an adhesive and a decolorizing agent in water or an organic solvent serving as a medium by a reverse roll coater, bar coater, knife coater, slot dye coater, reverse gravure coater, Vario gravure coater, screen printer or the like. The amount of the first adhesive layer is approximately in the range of 5 to 30 g/m², preferably 10 to 25 g/m², based on dry weight.

As a method of manufacturing adhesive sheets, there can utilize a transfer procedure in which an adhesive layer is formed on a released paper and a substrate is then laminated to the adhesive layer, or a direct procedure in which an adhesive is applied to a substrate and a released paper is then laminated thereto. Furthermore, various other known techniques in the field of manufacturing adhesive sheets are applicable.

The invention will be described below in more detail with reference to examples without limiting the scope thereof. In the followings, parts and percentages are all by weight, unless otherwise specified.

EXAMPLE 1

[Preparation of Heat Sensitive Recording Sheet]
Preparation of coating composition for undercoat layer A coating composition for an undercoat layer was prepared by mixing together 100 parts of calcined clay (Ansilex, product of Engelhard Corp.), 15 parts of styrene-butadiene copolymer latex (solids content: 50%), 30 parts of 10% aqueous solution of polyvinyl alcohol and 20 parts of water.
Preparation of Composition A A composition comprising 10 parts of 3-di-n-butylamino-6-methyl-7-anilinofluoran, 3 parts of 5% aqueous solution of methyl cellulose and 27 parts of water was pulverized to a mean particle size of 0.8 $\mu$m by a sand mill.
Preparation of Composition B A composition composed of 20 parts of 4,4'-isopropylidenediphenol, 5 parts of 5% aqueous solution of methyl cellulose and 55 parts of water was pulverized to a mean particle size of 2.2 $\mu$m by a sand mill.
Preparation of Composition C A composition composed of 25 parts of 1,2-bis(3-methylphenoxy)ethane, 7 parts of 5% aqueous solution of methyl cellulose and 48 parts of water was pulverized to a mean particle size of 1.2 $\mu$m by a sand mill.
Preparation of coating composition for heat sensitive recording layer A coating composition for forming a heat sensitive recording layer was prepared by mixing together with stirring 40 parts of Composition A, 80 parts of Composition B, 80 parts of Composition C, 10 parts of precipitated calcium carbonate, 20 parts of amorphous silica (oil absorption : 180 ml/100 g), 15 parts of 30% dispersion of zinc stearate and 100 parts of 15% aqueous solution of polyvinyl alcohol.

[Preparation of Heat Sensitive Recording Sheet]

On a surface (the top surface) of a wood-free paper of 70g/m$^2$, a coating composition for undercoat layer and a coating composition for heat sensitive recording layer were applied and dried so that the amount of the two compositions after drying were 10g/m$^2$ and 4g/m$^2$, respectively, to form an undercoat layer and a heat sensitive recording layer in this order, thereby obtaining a heat sensitive recording sheet. (A supercalender treatment was performed for the formed respective layers.)

[Preparation of an Adhesive Sheet]

100 parts of acrylic adhesive (trade name: AROSET 8600, concentration: 45%, Nippon Shokubai Co., Ltd.), 0.25 part of crosslinking agent (trade name: CORONATE L-55E, Nippon Shokubai Co., Ltd.), 9 parts of methyl myristate (melting point: 19° C.), and 125 parts of toluene, were mixed with stirring to obtain a coating composition for a first adhesive layer. The coating composition was applied and dried on a commercially available released paper by a reverse roll coater in an amount of 15g/m$^2$ after drying, to form a first adhesive layer, which was then laminated to a transparent polyester film of 50$\mu$m thick, thereby obtaining an adhesive sheet.

[Preparation of an Adhesive Sheet Set for Temperature Control]

An adhesive sheet set for temperature control was obtained comprising the above heat sensitive recording sheet and the adhesive sheet.

[Method of Using an Adhesive Sheet Set for Temperature Control]

A heat sensitive recording sheet was recorded by a bar code printer for heat sensitive recording (Model H-9606, TEC Co., Ltd.), and a released paper of an adhesive sheet was peeled off. The adhesive sheet was then laminated to a heat sensitive recording layer of the heat sensitive recording sheet through the first adhesive layer, and was left in a storage space requiring temperature control.

EXAMPLES 2 to 10

A heat sensitive recording sheet, an adhesive sheet and a temperature control sheet set were prepared in the same manner as in Example 1 except that the following compound was used in place of methyl myristate in the preparation of the adhesive sheet.

| Example 2: | n-decyl caprate | (mp: 10° C.) |
| Example 3: | isobutyl palmitate | (mp: 19° C.) |
| Example 4: | isoamyl stearate | (mp: 23° C.) |
| Example 5: | benzyl myristate | (mp: 21° C.) |
| Example 6: | n-dodecyl alcohol | (mp: 20° C.) |
| Example 7: | n-butyl laurate | (mp: −7° C.) |
| Example 8: | di-n-octyl phthalate | (mp: −25° C.) |
| Example 9: | di-n-butyl sebacate | (mp: −11° C.) |
| Example 10: | n-octylamine | (mp: −5° C.) |

EXAMPLE 11

A heat sensitive recording sheet, an adhesive sheet and a temperature control sheet set were prepared in the same manner as in Example 1 except that methyl myristate was used in an amount of 2 parts in place of 9 parts in the preparation of the adhesive sheet.

EXAMPLE 12

A heat sensitive recording sheet, an adhesive sheet and a temperature control sheet set were prepared in the same manner as in Example 1 except that methyl myristate was used in an amount of 27 parts in place of 9 parts in the preparation of the adhesive sheet.

EXAMPLE 13

A heat sensitive recording sheet, an adhesive sheet and a temperature control sheet set were prepared in the same manner as in Example 1 except that a coating composition for second adhesive layer comprising an acrylic adhesive latex having 40% solid concentrartion was applied and dried on a released layer of a commercially available released paper in an amount of 15g/m$^2$ after drying, to form a second adhesive layer, which was then laminated to the other surface (the rear surface) of a substrate of a heat sensitive recording sheet as obtained in the preparation of a heat sensitive recording sheet in Example 1, to obtain a heat sensitive recording sheet.

EXAMPLE 14

An adhesive sheet and a temperature control sheet set were prepared in the same manner as in Example 1 except that a coating composition for second adhesive layer comprising an acrylic adhesive latex having 40% solid concentration was applied and dried on a released layer of a commercially available released paper in an amount of 15g/m² after drying, to form a second adhesive layer, which was then laminated to the other surface of a polyester film of an adhesive sheet as obtained in the preparation of an adhesive sheet in Example 1, to obtain an adhesive sheet, and a transparent polyester film of 50g m thick was used in place of a wood-free paper of 70g/m² as used in the heat sensitive recording sheet of Example 1, to obtain a heat sensitive recording sheet.

COMPARATIVE EXAMPLE 1

A heat sensitive recording sheet, an adhesive sheet and a temperature control sheet set were prepared in the same manner as in Example 1 except that methyl myristate was not used in the preparation of an adhesive sheet in Example 1.

Evaluation tests were conducted for the heat sensitive recording sheet sets obtained in Examples 1 to 6 and 11 to 14, and Comparative Example 1. Table 1 shows the results.

[Recording Density]

Immediately after a heat sensitive recording sheet of a temperature control sheet set was recorded by a bar code printer for heat sensitive recording (Model H-9606, TEC Co., Ltd.), an adhesive sheet was laminated to a heat sensitive recording layer through the first adhesive layer, and recorded portions were measured by a Macbeth densitometer (Model RD-914 with a visual filter, Macbeth Corp.) at 20° C. and 65% RH.

[Reading Rate]

After an elapse of three minutes after a heat sensitive recording sheet of a temperature control sheet set was recorded by a bar code printer for heat sensitive recording (Model H-9606, TEC Co., Ltd.), an adhesive sheet was laminated on a heat sensitive recording layer through the first adhesive layer, and recorded portions were read 100 times by a bar code reader, available from Nippon Denso Co., Ltd., to measure the bar code reading rate (%) at room temperature.

[Properties of a Temperature Control Sheet Set]

A heat sensitive recording sheet of a temperature control sheet set was recorded by a bar code printer for heat sensitive recording (Model H-9606, TEC Co., Ltd.). After an elapse of five minutes after an adhesive sheet was laminated on a heat sensitive recording layer through the first adhesive layer at room temperature, it was preserved in a freezer kept at −20° C. for one month. Thereafter, the reading density of recorded portions was measured by the aforesaid Macbeth densitometer and the reading rate was measured by the aforesaid bar code reader at room temperature. Separately, an adhesive sheet was laminated on a heat sensitive recording layer of a heat sensitive recording sheet of a temperature control sheet set through the first adhesive layer at room temperature. Two hours later, the recording density of recorded portions and the reading rate were measured.

TABLE 1

|  | immedate after prepn. of sheet set | | after preserv. at −20° C. | | 2 hours later at room temp. | |
| --- | --- | --- | --- | --- | --- | --- |
|  | recording density | reading rate (%) | recording density | reading rate (%) | recording density | reading rate (%) |
| Ex.1 | 1.36 | 100 | 1.22 | 100 | 0.31 | 0 |
| Ex.2 | 1.36 | 100 | 1.25 | 100 | 0.38 | 0 |
| Ex.3 | 1.36 | 100 | 1.24 | 100 | 0.35 | 0 |
| Ex.4 | 1.36 | 100 | 1.25 | 100 | 0.35 | 0 |
| Ex.5 | 1.36 | 100 | 1.23 | 100 | 0.36 | 0 |
| Ex.6 | 1.36 | 100 | 0.97 | 100 | 0.32 | 0 |
| Ex.11 | 1.36 | 100 | 1.28 | 100 | 0.45 | 0 |
| Ex.12 | 1.36 | 100 | 0.92 | 100 | 0.30 | 0 |
| Ex.13 | 1.36 | 100 | 1.22 | 100 | 0.31 | 0 |
| Ex.14 | 1.32 | 100 | 1.18 | 100 | 0.30 | 0 |
| Com. Ex.1 | 1.35 | 100 | 1.31 | 100 | 1.33 | 100 |

Evaluation tests were conducted for the heat sensitive recording sheet sets obtained in Examples 7 to 10 and Comparative Example 1. Table 2 shows the results.

[Recording Density]

The recorded portions of the temperature control sheet set obtained were measured by a Macbeth densitometer (Model RD-914 with a visual filter, Macbeth Corp.).

[Reading Rate]

The recorded portions of the temperature control sheet set obtained were read 100 times by a bar code reader, available from Nippon Denso Co., Ltd., to measure the bar code reading rate (%).

[Properties of a Temperature Control Sheet Set]

Immediately after an adhesive sheet was laminated on a heat sensitive recording layer of a temperature control sheet set through the first adhesive layer at room temperature, it was preserved in a freezer kept at −50° C. for one month. Thereafter, the reading density of recorded portions was measured by the aforesaid Macbeth densitometer and the reading rate was measured by the aforesaid bar code reader. Separately, an adhesive sheet was laminated on a heat sensitive recording layer of a heat sensitive recording sheet for temperature control sheet set through the first adhesive layer at room temperature. After two hours later at 5° C., the recording density of recorded portions and the reading rate were measured.

TABLE 2

|  | immedate after prepn. of sheet set | | after preserv. at −50° C. | | 2 hours later at 5° C. | |
| --- | --- | --- | --- | --- | --- | --- |
|  | recording density | reading rate (%) | recording density | reading rate (%) | recording density | reading rate (%) |
| Ex.7 | 1.36 | 100 | 1.30 | 100 | 0.23 | 0 |
| Ex.8 | 1.36 | 100 | 1.23 | 100 | 0.24 | 0 |
| Ex.9 | 1.36 | 100 | 1.24 | 100 | 0.22 | 0 |
| Ex.10 | 1.36 | 100 | 0.95 | 100 | 0.28 | 0 |
| Com. Ex.1 | 1.35 | 100 | 1.35 | 100 | 1.33 | 100 |

As apparent from the results in Tables 1 and 2, the sheet set for temperature control of the invention is useful for checking a history of storage temperature.

We claim:

1. A sheet set for temperature control comprising a heat sensitive recording sheet having a heat sensitive recording layer incorporating a colorless or light-colored basic dye and a color acceptor, provided on a surface of a substrate, and an adhesive sheet having a first adhesive layer incorporating an adhesive and a decolorizing agent, provided on a surface of another substrate.

2. A sheet set for temperature control as defined in claim 1 wherein the decolorizing agent is a non-volatile organic compound having a melting point in the range of −50 ° C. to +40° C.

3. A sheet set for temperature control as defined in claim 1 or 2 wherein the decolorizing agent is an ester compound.

4. A sheet set for temperature control as defined in claim 3 wherein the decolorizing agent is an ester compound of the formula (1)

$$R_1COO\text{---}R_2 \quad (1)$$

wherein $R_1$ is $C_7\text{~}C_{17}$ alkyl, and $R_2$ is $C_1\text{~}C_{12}$ alkyl or benzyl.

5. A sheet set for temperature control as defined in claim 4 wherein the decolorizing agent is contained in the first adhesive layer in the amount of 5 to 35% by weight based on the first adhesive layer.

6. A sheet set for temperature control as defined in claim 4 herein a second adhesive layer incorporating an adhesive is provided on the other surface of the substrate of the heat sensitive recording sheet or the other surface of the substrate of the adhesive sheet.

7. A sheet set for temperature control as defined in claim 3 wherein the decolorizing agent is contained in the first adhesive layer in the amount of 5 to 35% by weight based on the first adhesive layer.

8. A sheet set for temperature control as defined in claim 3 wherein a second adhesive layer incorporating an adhesive is provided on the other surface of the substrate of the heat sensitive recording sheet or the other surface of the substrate of the adhesive sheet.

9. A sheet set for temperature control as defined in claim 1 or 2 wherein the decolorizing agent is contained in the first adhesive layer in the amount of 5 to 35% by weight based on the first adhesive layer.

10. A sheet set for temperature control as defined in claim 9 herein a second adhesive layer incorporating an adhesive is provided on the other surface of the substrate of the heat sensitive recording sheet or the other surface of the substrate of the adhesive sheet.

11. A sheet set for temperature control as defined in claim 1 or 2 wherein a second adhesive layer incorporating an adhesive is provided on the other surface of the substrate of the heat sensitive recording sheet or the other surface of the substrate of the adhesive sheet.

12. A method of using a sheet set for temperature control which is characterized in that the first adhesive layer of the adhesive sheet is laminated on the heat sensitive recording layer of the heat sensitive recording sheet, in the sheet set for temperature control of claim 1 or 2.

* * * * *